(12) United States Patent
Gherson et al.

(10) Patent No.: US 8,600,847 B1
(45) Date of Patent: Dec. 3, 2013

(54) OPTIMAL SERVICE FEE DISCOUNT MANAGEMENT

(75) Inventors: Diane J. Gherson, Ridgefield, CT (US); Nickle J. LaMoreaux, Brewster, NY (US); Richard Patterson, Ridgefield, CT (US); Carla Grant-Pickens, Upper Marlboro, MD (US); Anshul Sheopuri, White Plains, NY (US); Thomas A. Stachura, Wheaton, IL (US); Maheswaran Surendra, Croton-on-Hudson, NY (US); Brenda Swatek, Wappingers Falls, NY (US); Maria Tarsia, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/594,759

(22) Filed: Aug. 24, 2012

(51) Int. Cl.
*G06Q 40/00* (2012.01)
(52) U.S. Cl.
USPC ............ 705/30; 705/41; 705/80; 705/35; 705/38; 379/34; 709/224
(58) Field of Classification Search
USPC ........ 705/30, 40, 41, 80, 206, 26.9, 36 R, 35; 379/34, 127.01, 114.17; 709/224
See application file for complete search history.

(56) References Cited

U.S. PATENT DOCUMENTS

| | | | | |
|---|---|---|---|---|
| 5,568,541 A | * | 10/1996 | Greene | 379/114.25 |
| 5,963,625 A | * | 10/1999 | Kawecki et al. | 379/127.01 |
| 6,023,499 A | * | 2/2000 | Mansey et al. | 379/111 |
| 7,389,276 B1 | * | 6/2008 | Barnard et al. | 705/400 |
| 7,720,727 B2 | * | 5/2010 | Keyes et al. | 705/30 |
| 2007/0087756 A1 | * | 4/2007 | Hoffberg | 455/450 |
| 2007/0143171 A1 | * | 6/2007 | Boyd et al. | 705/10 |
| 2008/0288377 A1 | * | 11/2008 | Koukis | 705/30 |
| 2010/0332373 A1 | * | 12/2010 | Crabtree et al. | 705/37 |

OTHER PUBLICATIONS

Charles Manahan, A Proportional Hazards Approach to Campaign List Selection, Cingular Wireless, LLC. Atlanta, GA, SUGI 30 Proceeding, Philadelphia, Pennsylvania, Apr. 10-13, 2005, p. 1-7.
Michael Lewis, Research Note: A Dynamic Programming Approach to Customer Relationship Pricing, Management Science. vol. 51, No. 6, Jun. 2005, pp. 986-994.
Thomas H. Davenport et al., Competing on Talent Analytics, Harvard Business Review Oct. 2010, cover and pp. 1-6.

* cited by examiner

*Primary Examiner* — Vanel Frenel
(74) *Attorney, Agent, or Firm* — Louis J. Percello; Otterstedt, Ellenbogen & Kammer, LLP

(57) ABSTRACT

In an economic relationship between a first party and a plurality of second parties in connection with provision of at least one of goods and services for a fee, costs incurred by the first party, in connection with a loss of at least some of the second parties to the relationship, are estimated. A response curve of second party loss probability versus fee is also estimated. An optimal value of a modification to the fee is determined, such that profits of the first party are maximized, taking into account the costs incurred by the first party in connection with the loss of the at least some of the second parties and the response curve of the second party loss probability versus the fee. At least one action to take in response to the determining of the optimal value is determined.

23 Claims, 5 Drawing Sheets

OPTIMAL SERVICE FEE DISCOUNT MANAGEMENT

STATEMENT OF GOVERNMENT RIGHTS

Not Applicable.

CROSS-REFERENCE TO RELATED APPLICATIONS

Not Applicable.

FIELD OF THE INVENTION

The present invention relates to the electrical, electronic and computer arts, and, more particularly, to processes and services analytics and the like.

BACKGROUND OF THE INVENTION

In economic relationships, one party typically exchanges funds with another party who provides goods or services. Examples of such relationships include a merchant who provides goods to customers in return for funds and a service provider such as a wireless telephone service provider who provides cellular telephone service in return for funds.

Parties in such relationships may want to be sure that goods and/or services are fairly priced. For example, merchants and/or service providers will wish to ensure that their customers will be happy with the price and not take their business elsewhere.

SUMMARY OF THE INVENTION

Principles of the invention provide techniques for optimal service fee discount management. In one aspect, an exemplary method includes the step of, in an economic relationship between a first party and a plurality of second parties in connection with provision of at least one of goods and services for a fee, estimating costs incurred by the first party in connection with a loss of at least some of the second parties to the relationship. Further steps include estimating a response curve of second party loss probability versus fee; determining an optimal value of a modification to the fee, such that profits of the first party are maximized, taking into account the costs incurred by the first party in connection with the loss of the at least some of the second parties and the response curve of the second party loss probability versus the fee; and determining at least one action to take in response to the determining of the optimal value.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects, such as enhanced accuracy.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
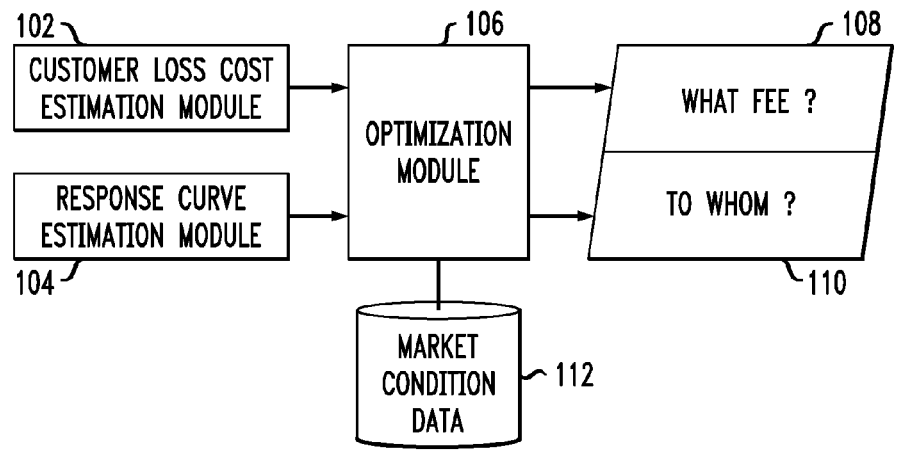
FIG. 1 shows a software architecture diagram, in accordance with an aspect of the invention.

One or more embodiments address determination of the service fee discounts to provide to a customer in a cost-effective manner. One or more embodiments employ five components, namely, Customer Loss Cost Estimation, Response Curve Estimation, Optimization, Projection and Decision Rule Development. These components address the following questions:

Customer Loss Cost Estimation: What is the cost of customer loss? For example, consider Customer 1, a customer who is paying full price (say, $100) for a service, while Customer 2 is on a special contract who only pays $80. Thus, it is seen that the cost of losing a customer is not the same in every case. For Customer 1, the cost of losing the customer is $100, but for Customer 2, only $80.

Response Curve Estimation: How does attrition likelihood vary with service fee? An examination is made of retained versus lost customers to determine the effect of price (discount) versus customer retention. This data may be normalized to account for socioeconomic status or the like. Response curve estimation is, in and of itself, well known in the marketing context. One non-limiting example of a suitable approach is set forth in Charles Manahan, Cingular Wireless, LLC, Atlanta, Ga., "A Proportional Hazards Approach to Campaign List Selection," Paper 084-30, SAS User's Group International, Data Mining and Predictive Modeling, Philadelphia, Pa., Apr. 10-13, 2005, Proceedings of the Thirtieth Annual SAS® Users Group International Conference.

Optimization: At what point is service fee price and customer loss cost optimized? Here, the cost of losing a customer is taken into account in determining how to allocate discounts. All other things being equal, discounts should generally be allocated first to those customers of greater value (i.e., whose cost of loss is higher).

Projection: What does the optimal service fee translate into projected movement in service fee next year incorporating market conditions? By way of explanation, suppose that this year there is a budget of $10 million for offering customer retention discounts. This budget will likely not be worth $10 million next year, due to factors such as inflation, market movement, and so on.

Decision Rules: What customer populations should be the focus in allocating service fee discounts? For example, customers who have already received several discounts may not be eligible to receive further discounts; there may, in general, be certain exclusionary criteria applied regardless of the optimization process.

One or more embodiments thus provide a method and system to determine service fee discounts to maximize profits, including customer loss cost and service fee, incorporating:

Estimating the cost of customer loss including fixed costs such as hardware and software installation costs, lost productivity, etc. and recurring costs such as service fee loss;

Estimating the response curve of customer loss probability versus service fee;

Determining the optimal service fee for a customer, so as to maximize profits, including customer loss cost and service fee; and Determining the optimal actions to take (for example, give a discount on service fee) incorporating market movement.

Figure 2:
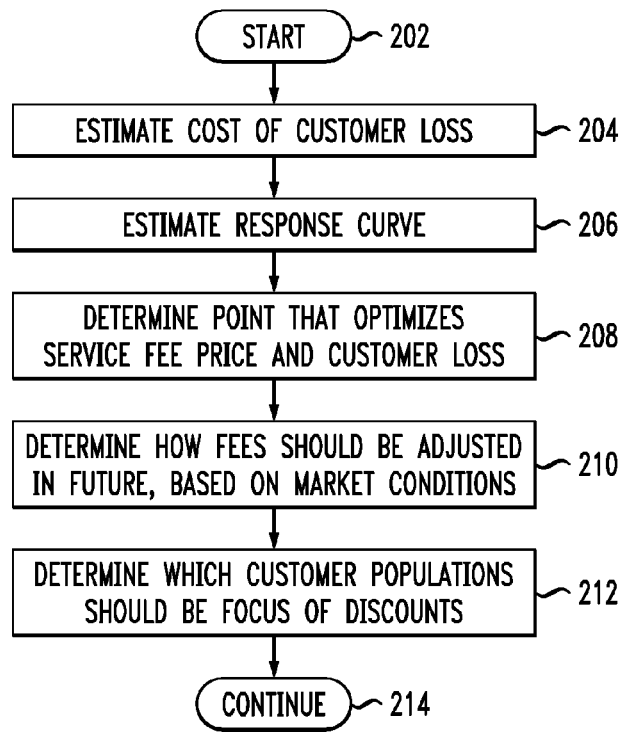
FIG. 2 shows a flow chart, in accordance with an aspect of the invention.

FIGS. 1 and 2 show, respectively, a software architecture diagram and a flow chart, in accordance with aspects of the invention. The flow chart of FIG. 2 begins at 202. Customer Loss Cost Estimation module 102 is a software component which, when executed on one or more hardware processors, carries out the functions of the Customer Loss Cost Estimation component described above; for example, it can be used to carry out step 204, wherein the cost of customer loss is estimated as described above—for example, by accessing a billing database to determine what each customer is currently paying. Response Curve Estimation module 104 is a software component which, when executed on one or more hardware processors, carries out the functions of the Response Curve Estimation component described above; for example, it can be used to carry out step 206, wherein the response curve is estimated. Optimization module 106 is a software component which, when executed on one or more hardware processors, carries out the functions of the Optimization component described above, taking input from the modules 102, 104. For example, it can be used to carry out step 208, wherein the point that optimizes service fee price and customer loss is estimated (for a non-limiting example of one manner in which this can be done, please refer to the "Optimization example" section below. As seen at 108, optimization module 106 also determines what the optimal service fee translates into projected movement in service fee next year incorporating market conditions stored in market conditions data store 112. For example, it can be used to carry out step 210, wherein a determination is made how fees should be adjusted in the future, based on market conditions such as are stored in adapt store 112. Furthermore, as seen at 110, optimization module 106 determines appropriate decision rules, such as what customer populations should be the focus in allocating service fee discounts. For example, it can be used to carry out step 212, wherein a determination is made regarding which customer populations should be the focus of discounts. Processing continues in step 214 of the flow chart of FIG. 2.

Referring again to module 102 and step 204, with regard to attrition cost estimation, the average cost of a customer loss considers both the in-year and the ongoing cost impact and can be quite significant. In a typical situation, most of the customer loss costs are generated from service fee replacement costs. Service fee replacement costs depend on the service fee of the customer lost. In some instances, for simplicity, "soft" cost impact factors, such as climate, morale, and brand impact, are not considered. A significant parameter in one or more embodiments is the cost of 1% customer loss. Assume, for example, that this costs $X on average. "Who" is leaving will determine the actual cost of customer attrition. In some instances, the first 1% reduction is worth more than the 2nd, and so on.

Furthermore in this regard, there are two pertinent components, namely fixed costs and recurring costs. Examples of the former are the costs of attracting new customers, installation costs or the like that must be borne by the company, account set-up, and so on. An example of the latter is the loss of a customer paying $100 a month who is replaced with someone who only pays $90 a month. This results in a recurring cost of $10 per month.

Figure 3:
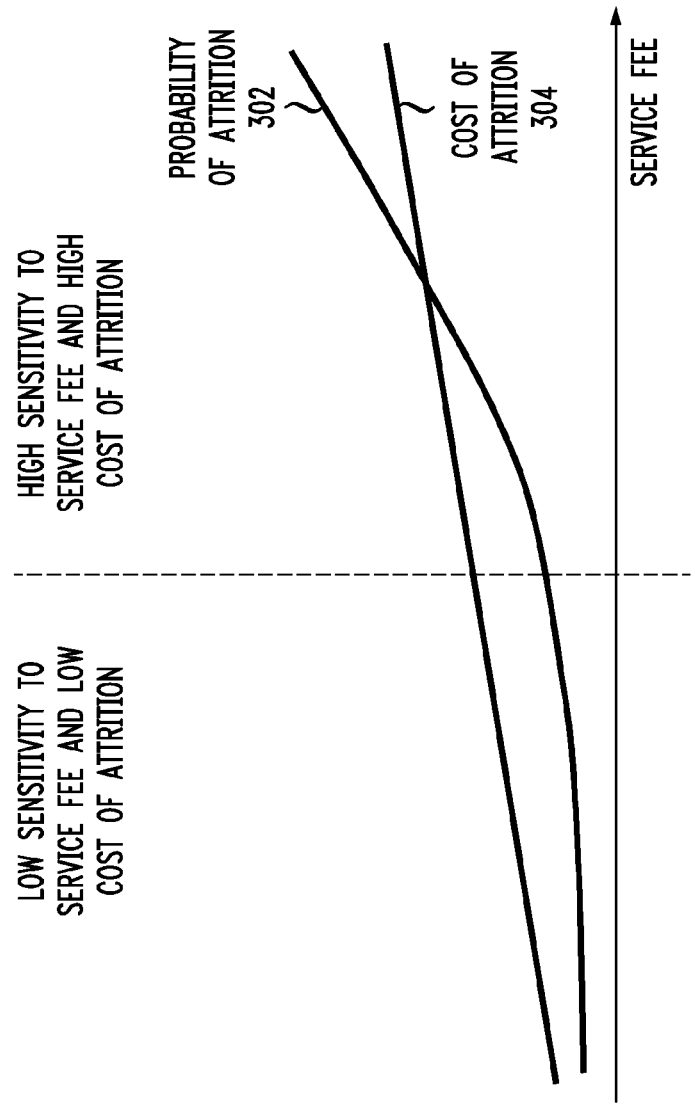
FIG. 3 shows exemplary response curve estimation, in accordance with an aspect of the invention.

Referring again to module 104 and step 206, and referring also now to FIG. 3, it will be noted that in a typical case, giving discounts to those paying the highest service fee will yield the largest retention benefit. Curve 302 shows the loss probability, i.e., the probability of losing a customer for a given service fee change. Line 304 shows the loss cost as a function of change in service fee. By way of example, suppose a customer paying $150 per month is lost but due to market conditions, a new customer comes in at only $100 per month. In optimization, due consideration should be given to loss probability versus service fee and loss cost versus service fee.

Figure 4:
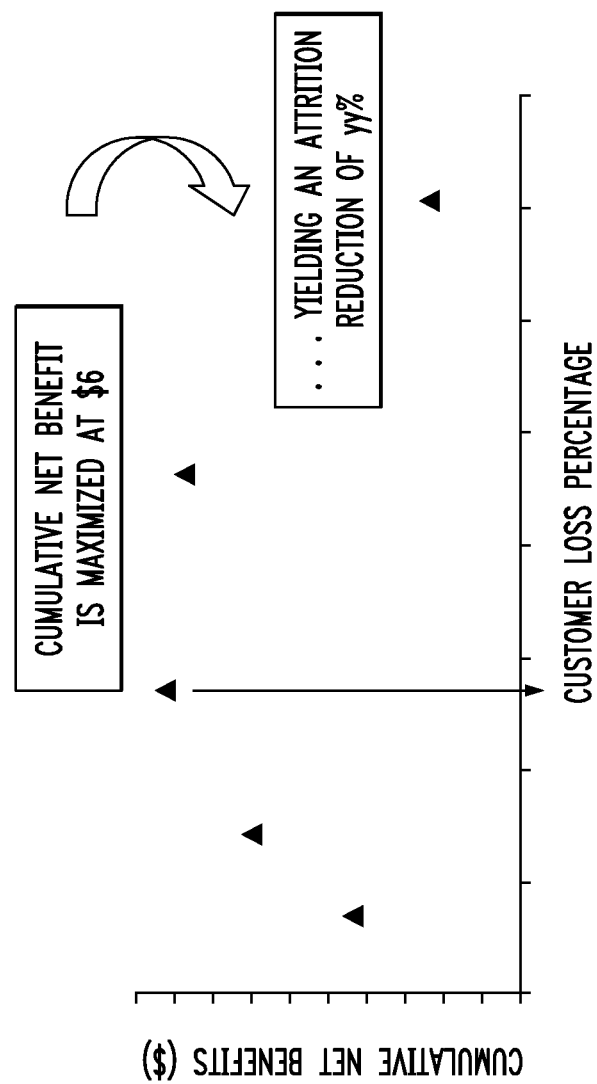
FIG. 4 shows exemplary optimization, in accordance with an aspect of the invention.

Referring again to module 106 and step 208, and referring also now to FIG. 4, it should be noted that giving customers discounts to bring them to the optimal service fee level will yield, in this example, an $xx net benefit (here, $6) and will reduce customer loss by yy % (actual value will depend on the data in a given instance).

Optimization Example:

Furthermore with regard to optimization, by way of a non-limiting example, the following can be determined for each customer. For a given customer, suppose s is the current service fee, the associated loss probability is $p(s)$, and the associated loss cost, given a loss, is $c(s)$. Suppose that the service fee is reduced by x, where x is to be determined. Then, from the response curve estimation module 104, the new service fee s−x, results in loss probability $p(s-x) \leq p(s)$. Furthermore, from the loss estimation module 102, the loss cost now is $c(s-x) \leq c(s)$.

Therefore, the change in expected revenue due to change in service fee from s to s−x is:

$$(s-x)*(1-p(s-x))-p(s-x)*c(s-x)-[s*(1-p(s))-p(s)*c(s)]$$

The optimization is performed using a grid search on x to maximize $(s-x)*(1-p(s-x))-p(s-x)*c(s-x)-[s*(1-p(s))-p(s)*c(s)]$.

Figure 5:
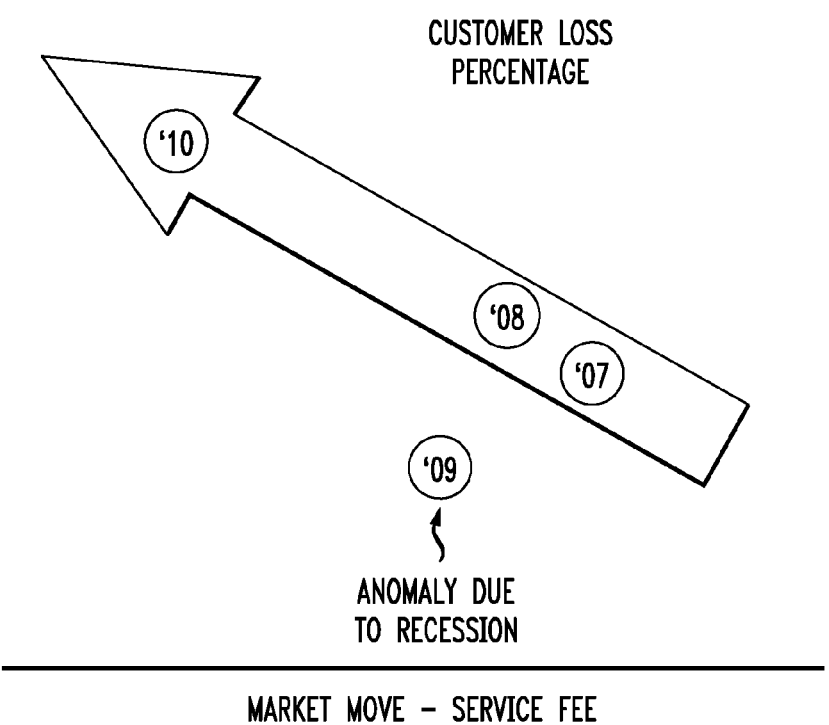
FIG. 5 shows exemplary correlation between service fee and customer loss percentage, in accordance with an aspect of the invention.

Referring again to module 106, data store 112, output 108, above discussion of the projection component, and step 210, and referring also now to FIG. 5, it should be noted that in one or more instances, parallel analysis shows a strong correlation between service fee as compared to the external market and customer loss percentage. In particular, FIG. 5 shows the customer loss percentage for the years 2007, 2008, 2009, and 2010 as a function of the service fee; the increase in the fee generally is directly proportional to the customer loss percentage, except for the anomalous data point for 2009, which is believed to be due to the recessionary economic conditions that year. Thus, the percentage of customers likely to be lost depends on the market conditions. If a merchant or service provider charges less than the market price, customer loss is less likely than for a merchant or service provider that charges more than the market price. If a fixed account of money is to be allocated for discounts to retain customers, it is advisable to take into account how the market price will change in the coming year.

The following are some non-limiting examples of questions that it might be desired to answer using one or more techniques in accordance with aspects of the invention:
1. What level of investment in a pool of money for fee discounts will achieve the same loss percentage results as a certain prior year (say, 2010)?
    Low: Same level relative to market as last year
    High: Near-market movement
    Working: Heuristic rule Average of Low and High
2. What level of service fee will achieve the target retention level?
    Adjust BAU (business as usual) investments by suggested optimized customer loss levels Unlike certain prior art techniques, one or more embodiments are not limited to treating the cost of attrition as identical across all customers; rather, the fact that attrition of different customers may have different costs can be taken into account in one or more embodiments. Furthermore, one or more embodiments take into account dimensions such as performance, skill level, and the like.

While non-limiting exemplary embodiments have been provided in the context of customer retention (e.g., in services such as cell phone services or products such as computing devices), embodiments of the invention can also be used for other purposes, and are generally applicable to an economic relationship between a first party and one or more second parties in connection with provision of at least one of goods and services for a fee. For example, an employer may want to address the problem of ensuring fair compensation for its employees.

Given the discussion thus far, it will be appreciated that, in general terms, an exemplary method, according to an aspect of the invention, includes the step 204 of, in an economic relationship between a first party and a plurality of second parties in connection with provision of at least one of goods and services for a fee, estimating costs incurred by the first party (e.g., a provider of the services and/or goods) in connection with a loss of at least some of the second parties to the relationship (e.g., customers) (for example, using module 102 executing on one or more suitable hardware processors). A further step 206 includes estimating a response curve of second party (e.g., customer) loss probability versus fee (for example, using module 104 executing on one or more suitable hardware processors). A still further step 208 includes determining an optimal value of a modification (e.g., discount) to the fee (e.g., fee to be charged to the customers by the provider), such that profits of the first party (e.g., provider) are maximized, taking into account the costs incurred by the first party (e.g., provider) in connection with the loss of at least some of the second parties (e.g., customers) and the response curve of the second party (e.g., customer) loss probability versus the fee (for example, using module 106 executing on one or more suitable hardware processors). A still further step (e.g., 210 and/or 212) includes determining (or at least facilitating determination of) at least one action (e.g., 108, 110) to take in response to the determining of the optimal value (for example, using module 106 executing on one or more suitable hardware processors, and optionally in conjunction with market condition data store 112).

In some instances, the determining of the at least one action includes determining how the service fee should be adjusted in a future time, as at 108, based on market conditions (e.g., from store 112). In some such cases, the adjustment of the service fee in the future time is a discount, and the determining of the at least one action further includes determining which of the customers should be a focus of the discount, as at 110.

In some cases, the action determined could be just determining which of the customers should have the service fee adjusted in a future time.

In one or more embodiments, in step 102, the estimating of the costs incurred by the provider in connection with the loss of customers includes estimating both fixed costs and recurring costs. Non-limiting examples of the former include hardware installation costs, software installation costs, and lost productivity. Non-limiting examples of the latter include loss of the service fees.

Thus, one or more embodiments consider the cost, in lost revenue, of lowering the price offered to a customer; the cost of losing the customer; and the likelihood of retaining the customer if a change is made in the price charged. With regard to this latter factor, consideration is given whether a given change (e.g., decrease) in the price charged will result in a relatively large increase in the chance of retaining the customer, or only a relatively small increase.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 6:
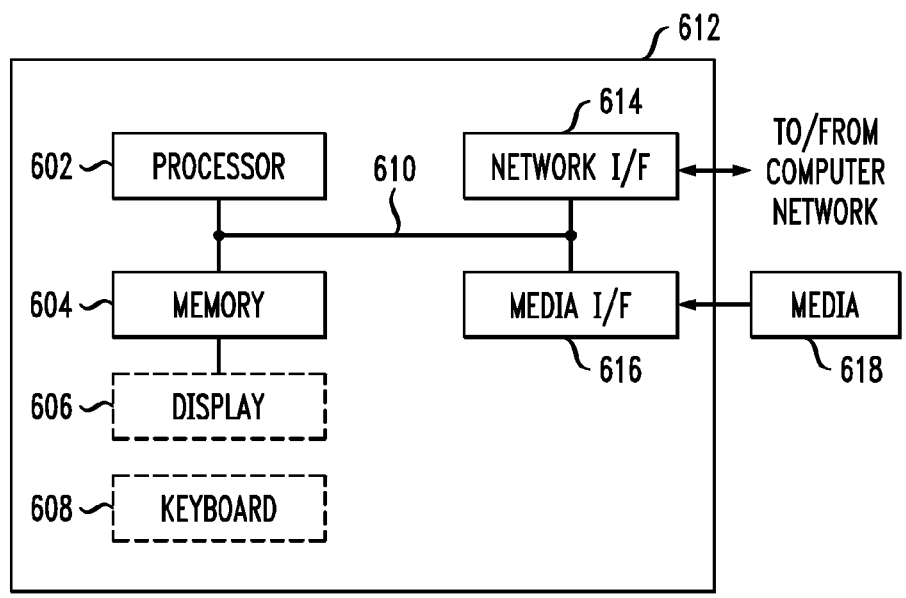
FIG. 6 depicts a computer system that may be useful in implementing one or more aspects and/or elements of the invention.

One or more embodiments can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 618 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a customer loss cost estimation module, a response curve estimation module, and an optimization module (possibly coupled to a suitable market condition data store). The method steps can then be carried out using the distinct software modules and/or sub-modules of the system, as described above, executing on one or more hardware processors 602. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   in an economic relationship between a first party and a plurality of second parties in connection with provision of at least one of goods and services for a fee, estimating costs incurred by said first party in connection with a loss of at least some of said second parties to said relationship, wherein the costs incurred by said first party are not identical for each loss of said second parties;
   estimating a response curve of second party loss probability versus fee;
   determining an optimal value of a modification to said fee, such that profits of said first party are maximized, taking into account said costs incurred by said first party in connection with said loss of said at least some of said second parties and said response curve of said second party loss probability versus said fee; and
   determining at least one action to take in response to said determining of said optimal value;
   providing a system, said system comprising distinct software modules stored in a non-transitory manner on at least one computer-readable storage medium, said modules comprising a second party loss cost estimation module, a response curve estimation module, and an optimization module;
   wherein:
   said estimating of said costs incurred by said first party is carried out by said second party loss cost estimation module executing on at least one hardware processor;
   said estimating of said response curve is carried out by said response curve estimation module executing on said at least one hardware processor;
   said determining of said optimal value is carried out by said optimization module executing on said at least one hardware processor; and
   said determining of said at least one action to take is carried out by said optimization module executing on said at least one hardware processor.

2. The method of claim 1, wherein said first party comprises a provider of said at least one of goods and services, said second parties comprise customers of said first party, and said modification to said fee comprises a discount.

3. The method of claim 2, wherein said determining said at least one action comprises determining how said fee should be adjusted in a future time, based on market conditions.

4. The method of claim 3, wherein said adjustment of said service fee in said future time comprises a discount, and wherein said determining said at least one action further comprises determining which of said customers should be a focus of said discount.

5. The method of claim 2, wherein said determining said at least one action comprises determining which of said customers should have said fee adjusted in a future time.

6. The method of claim 2, wherein said estimating of said costs incurred by said provider in connection with said loss of customers comprises estimating both fixed costs and recurring costs.

7. The method of claim 6, wherein said estimating of said fixed costs comprises estimating at least one of hardware installation costs, software installation costs, and lost productivity.

8. The method of claim 6, wherein said estimating of said recurring costs comprises estimating at least loss of said fees.

9. A computer program product comprising a computer readable storage medium having computer readable program code embodied therewith, stored thereon in a non-transitory manner, said computer readable program code comprising:
 computer readable program code configured to, in an economic relationship between a first party and a plurality of second parties in connection with provision of at least one of goods and services for a fee, estimate costs incurred by said first party in connection with a loss of at least some of said second parties to said relationship, wherein the costs incurred by said first party are not identical for each loss of said second parties;
 computer readable program code configured to estimate a response curve of second party loss probability versus fee;
 computer readable program code configured to determine an optimal value of a modification to said fee, such that profits of said first party are maximized, taking into account said costs incurred by said first party in connection with said loss of said at least some of said second parties and said response curve of said second party loss probability versus said fee; and
 computer readable program code configured to determine at least one action to take in response to said determining of said optimal value.

10. The computer program product of claim 9, wherein said first party comprises a provider of said at least one of goods and services, said second parties comprise customers of said first party, and said modification to said fee comprises a discount.

11. The computer program product of claim 10, wherein said computer readable program code configured to estimate said costs incurred by said provider in connection with said loss of customers comprises computer readable program code configured to estimate both fixed costs and recurring costs.

12. The computer program product of claim 11, wherein said computer readable program code configured to estimate said fixed costs comprises computer readable program code configured to estimate at least one of hardware installation costs, software installation costs, and lost productivity.

13. The computer program product of claim 11, wherein said computer readable program code configured to estimate said recurring costs comprises computer readable program code configured to estimate at least loss of said fees.

14. An apparatus comprising:
 a memory; and
 at least one processor, coupled to said memory, and operative to:
  in an economic relationship between a first party and a plurality of second parties in connection with provision of at least one of goods and services for a fee, estimate costs incurred by said first party in connection with a loss of at least some of said second parties to said relationship, wherein the costs incurred by said first party are not identical for each loss of said second parties;
  estimate a response curve of second party loss probability versus fee;
  determine an optimal value of a modification to said fee, such that profits of said first party are maximized, taking into account said costs incurred by said first party in connection with said loss of said at least some of said second parties and said response curve of said second party loss probability versus said fee; and
  determine at least one action to take in response to said determining of said optimal value.

15. The apparatus of claim 14, wherein said first party comprises a provider of said at least one of goods and services, said second parties comprise customers of said first party, and said modification to said fee comprises a discount.

16. The apparatus of claim 15, wherein said at least one processor is operative to estimate said costs incurred by said provider in connection with said loss of customers by estimating both fixed costs and recurring costs.

17. The apparatus of claim 16, wherein said at least one processor is operative to estimate said fixed costs by estimating at least one of hardware installation costs, software installation costs, and lost productivity.

18. The apparatus of claim 16, wherein said at least one processor is operative to estimate said recurring costs by estimating at least loss of said fees.

19. The apparatus of claim 15, further comprising a plurality of distinct software modules, each of the distinct software modules being embodied on a computer-readable storage medium, and wherein the distinct software modules comprise a customer loss cost estimation module, a response curve estimation module, and an optimization module;
 wherein:
 said at least one processor is operative to estimate said costs incurred by said provider by executing said customer loss cost estimation module;
 said at least one processor is operative to estimate said response curve by executing said response curve estimation module;
 said at least one processor is operative to determine said optimal value by executing said optimization module; and
 said at least one processor is operative to determine said at least one action to take by executing said optimization module.

20. An apparatus comprising:
 means for, in an economic relationship between a first party and a plurality of second parties in connection with provision of at least one of goods and services for a fee, estimating costs incurred by said first party in connection with a loss of at least some of said second parties to said relationship, wherein the costs incurred by said first party are not identical for each loss of said second parties;
 means for estimating a response curve of second party loss probability versus fee;
 means for determining an optimal value of a modification to said fee, such that profits of said first party are maximized, taking into account said costs incurred by said first party in connection with said loss of said at least some of said second parties and said response curve of said second party loss probability versus said fee; and
 means for determining at least one action to take in response to said determining of said optimal value.

21. The apparatus of claim 20, wherein said first party comprises a provider of said at least one of goods and services, said second parties comprise customers of said first party, and said modification to said fee comprises a discount.

22. The apparatus of claim 21, wherein said means for estimating said costs incurred by said provider in connection with said loss of customers comprises means for estimating both fixed costs and recurring costs.

23. The apparatus of claim 22, wherein:
said means for estimating said fixed costs comprise means for estimating at least one of hardware installation costs, software installation costs, and lost productivity; and
said means for estimating said recurring costs comprise means for estimating at least loss of said fees.

* * * * *